United States Patent [19]

Meermans

[11] 3,791,604

[45] Feb. 12, 1974

[54] MAGNETIC RECORDING AND/OR PLAYING BACK APPARATUS

[75] Inventor: Matheus Johannes Marie Meermans, Emmasingel, Eindhoven, Netherlands

[73] Assignee: U.S. Philips Corporation, New York, N.Y.

[22] Filed: Mar. 10, 1972

[21] Appl. No.: 233,661

[30] Foreign Application Priority Data

Mar. 25, 1971 Netherlands ........................ 7104001

[52] U.S. Cl. ................................ 242/68.3, 242/210

[51] Int. Cl. ............................................ B65h 17/02

[58] Field of Search ... 242/68.3, 199, 200, 201, 210

[56] References Cited

UNITED STATES PATENTS 3,666,193 5/1972 Wellington ......................... 242/68.3

3,456,892 7/1969 Krymbein .......................... 242/68.3

3,532,293 10/1970 Rose .................................. 242/200

*Primary Examiner*—George F. Mautz

*Assistant Examiner*—Edward J. McCarthy

*Attorney, Agent, or Firm*—Frank R. Trifari

[57] ABSTRACT

In an apparatus for recording and/or playing back magnetic recordings on and/or from a magnetic tape accommodated in a cassette, having at least one winding spindle adapted to be received in a flangeless winding core provided in the cassette, the winding spindle comprising a turntable which is mounted for rotation and has a sheath-like hub. A carrier element is mounted on this hub and has the shape of an ogival hat with radially projecting ogival carrier ribs. The turntable and the carrier element have abutment means which limit the relative rotation of the carrier element with respect to the turntable and by which the rotation of the turntable is imparted to the carrier element.

3 Claims, 5 Drawing Figures

MAGNETIC RECORDING AND/OR PLAYING BACK APPARATUS

The invention relates to an apparatus for recording and/or playing back magnetic recordings on and/or from a tape-shaped record carrier accommodated in a cassette. The cassette typically has at least one bored flangeless winding core adapted to be placed on a winding spindle which is provided in the apparatus. The spindle has a turntable which is arranged to be driven by driving means of the apparatus, is mounted for rotation on an end of a fixed axle, includes a sheath-like hub part, and a bearing element which is mounted for rotation about the other end of the axle remote from the turntable and includes a radially extending supporting surface which rests on an end face of the turntable hub remote from the turntable. A carrier element is mounted for rotation on the turntable hub and is provided with at least one radially projecting carrier rib which for driving a winding core is adapted to cooperate with radial projections provided in the core bore. The turntable and the carrier element are provided with co-operating coupling members which enable the carrier element to be driven by the driven turntable.

A known apparatus of this type is provided with two winding spindles, the hub part of the turntable having an outer circumference which has the form of a polygon, in particular a hexagon, whilst the carrier element is a ring having a corresponding hexagonal inner circumference, so that on rotation of the turntable the carrier element is driven. To enable the carrier ribs of the carrier element and the radial projections of a core bore to cooperate after the cassette has been placed on the winding spindles, the carrier element must have a certain degree of freedom of movement relative to the turntable so that when the turntable is driven the ribs of the carrier element can find their way between the projections of the core bore. For this purpose, the known carrier element is axially movable along the hub part of the turntable, a compression spring being provided between the carrier element and the turntable, which spring when the cassette is placed on the winding spindles permits a resilient displacement of the carrier element in the direction towards the turntable. When the turntable is driven and the carrier ribs are disposed opposite the spaces provided between the projections on the core bore the carrier element returns resiliently along the hub part so as to establish the cooperation between the carrier ribs and the projections. The bearing element mounted for rotation about the axle end remote from the turntable is in the form of a sleeve provided with a flange which limits the return movement of the carrier element due to the force of the compression spring.

It is an object of the invention to provide an improved arrangement and for this purpose an apparatus according to the invention is characterized in that the carrier element is in the form of an ogival hat having ogival carrier ribs, the carrier element and the bearing element forming an integral unit. The turntable and the carrier element are relatively rotatable within given limits and are each provided with abutment means which limit the relative rotation and by means of which the rotation of the driven turntable is imparted to the carrier element.

The special shapes of the carrier element and of the carrier ribs in conjunction with the possibility of relative rotation of the turntable and the carrier element ensure that when a cassette is placed on the apparatus a winding core can find its way along the carrier element, permitting the carrier ribs and the projections in the core bore to cooperate. The separate bearing sleeve and compression spring required in the known arrangement are dispensed with, which results in considerable saving in the costs of manufacture and assembly.

A preferred embodiment of the invention consists in that the hub part is cylindrical and near the turntable is provided with a cylindrical collar which is interrupted for part of its circumference. The hat-like carrier element has a cylindrical skirt which is provided with an axial projection extending in the area in which the cylindrical collar of the hub is interrupted. This arrangement according to the invention ensures that when the turntable is driven it is simply coupled to the carrier element.

An embodiment of a winding spindle according to the invention will now be described, by way of example, with reference to the accompanying drawings, in which:

FIGS. 1 and 2 show a known winding spindle of a type two of which are generally provided in an apparatus for recording and/or playing back magnetic recordings on and/or from a tape-shaped record carrier which is accommodated in a cassette, not shown, which includes two bored flangeless winding cores adapted to be placed on the two winding spindles of the apparatus.

Figure 1:
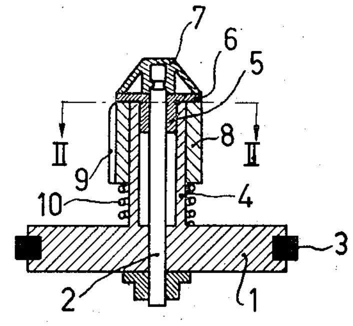
FIG.1 is a longitudinal sectional view of a known winding spindle.
Figure 2:
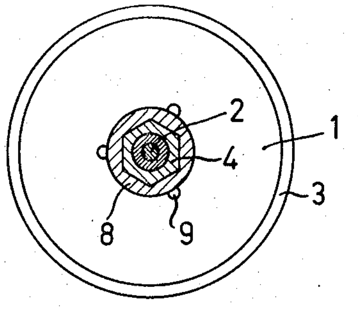
FIG. 2 is a cross-sectional view taken on the line II—II of FIG. 1.

The known winding spindle is formed by a turntable 1 mounted for rotation on one end of a fixed axle 2. The turntable 1 is provided at its circumference with a resilient tire 3 by means of which the turntable can be driven by driving means forming part of the apparatus. The turntable has a sheath-like hub part 4 which surrounds the axle 2 with a certain amount of clearance and the outer circumference of which is polygonal, for example hexagonal. A bearing sleeve 5 which is rotatable about the axle 2 is clamped in the end of the hub 4 remote from the turntable. The sleeve 5 is provided with a flange 6 which rests on the end surface of the hub 4. A closing cap 7 is clamped on the end of the axle 2 protruding from the sleeve 5. An annular carrier element 8 is mounted on the hub 4 so as to be axially displaceable, for which purpose the inner circumference of the element 8 also is hexagonal. The carrier element 8 has three radially projecting carrier ribs 9 which for driving a cassette core are capable of cooperating with radial projections in the core bore. A compression spring 10 is arranged between the carrier element 8 and the turntable 1 and urges the carrier element into contact with the flange 6. When a cassette is placed on winding spindles of this known type initially, the carrier element 8 is depressed against the force of the spring 10, enabling the carrier ribs 9 to find their way between the projections in the bores of the winding cores when the turntable 1 is driven. When the ribs 9 are disposed opposite the intermediate spaces between the projections, the spring 10 presses back the carrier element 8 so that the ribs and the projections cooperate. The flange 6 limits the return movement of the carrier element 8.

Figure 3:
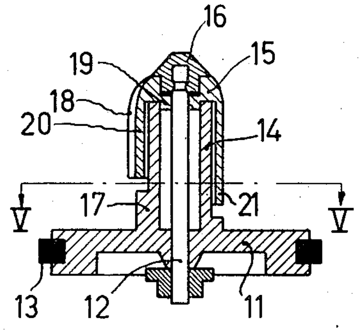
FIG. 3 is a longitudinal sectional view of a winding spindle according to the invention.
Figure 4:
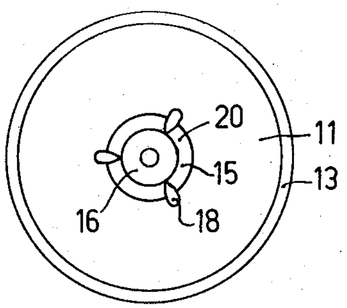
FIG. 4 is a plan view of the winding spindle shown in FIG. 3.
Figure 5:
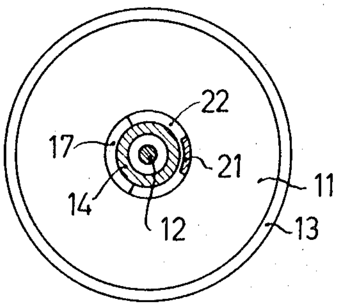
FIG. 5 is a cross-sectional view taken on the line V—V of FIG. 3.

The winding spindle according to the invention shown in FIGS. 3 to 5 comprises a turntable 11 which is mounted for rotation about an axle 12, is provided at its circumference with a resilient tire 13 and has a hub part 14, a carrier element 15 and a closing cap 16 clamped on the axle end. The hub part 14 is cylindrical and is provided at the end near the turntable with a cylindrical collar 17 which is interrupted for part of its circumference. The carrier element 15 is in the form of an ogival hat and has three carrier ribs 18 having also an ogival shape. The hat-like carrier element, which bears on the end face of the hub 14, comprises a bearing part 19 arranged for rotation about the axle and a cylindrical skirt 20 which is mounted on the hub 14 so as to be capable of a restricted rotation relative to this hub in that the skirt 20 is provided with an axial projection 21 extending in an area 22 (FIG. 5) in which the cylindrical collar 17 of the hub is interrupted.

The ogival shapes of the carrier element 15 and its ribs 18 and the possibility of rotation of the carrier element 15 relative to the hub 14 ensure that when a cassette is placed on the windings spindles the carrier ribs may readily find their way into the spaces between the projections in the bores of the winding cores, the carrier element being set into rotation when the turntable is driven and the collar 17 of the turntable hub strikes the projection 21 on the skirt 20 of the carrier element.

What is claimed is:

1. In an apparatus for recording and/or playing back magnetic recordings on and/or from a tape-shaped record carrier accommodated in a cassette having at least one bored flangeless winding core adapted to be placed on a winding spindle comprising a fixed axle mounted on said apparatus, a turntable rotatably mounted on an end of said axle, driving means carried by said apparatus for driving said turntable, a sheath-like hub carried on said turntable, a bearing element rotatably mounted at the end of said axle remote from said turntable, said bearing having a radially extending supporting surface resting on an end of said hub remote from said turntable, a carrier element in the shape of an ogival hat integral with said bearing element rotatably mounted on said hub, at least one radially projecting ogival shaped carrier rib mounted on said carrier element arranged for driving engagement with radial projections in the bore of the winding core of said cassette when said cassette is in place on said spindle, a first coupling member carried on said carrier element, a second coupling member carried on said turntable arranged for coupling engagement with said first coupling member when said turntable is driven so as to drive said carrier element, and abutment means mounted on said carrier element and said turntable for limiting rotatable movement of said carrier element with respect to said turntable and for imparting rotational movement of said turntable to said carrier element.

2. In the apparatus according to claim 1 wherein said hub part is cylindrical, and having a cylindrical collar about said hub part adjacent said turntable, and wherein said abutment on said turntable is formed by an interruption of said collar for a portion of its circumference.

3. In the apparatus according to claim 2 wherein said abutment on said carrier element comprises a cylindrical skirt having an axial projection extending in the area of said interruption of said cylindrical collar.

* * * * *